United States Patent
Felkl

(10) Patent No.: US 9,638,515 B2
(45) Date of Patent: May 2, 2017

(54) METHOD FOR ACTUATING A TANDEM ROLL TRAIN, CONTROL AND/OR REGULATING DEVICE FOR A TANDEM ROLL TRAIN, MACHINE-READABLE PROGRAM CODE, STORAGE MEDIUM AND TANDEM ROLL TRAIN

(75) Inventor: Hans-Joachim Felkl, Forchheim (DE)

(73) Assignee: PRIMETALS TECHNOLOGIES GERMANY GMBH, Erlangen (DE)

( * ) Notice: Subject to any disclaimer, the term of this patent is extended or adjusted under 35 U.S.C. 154(b) by 542 days.

(21) Appl. No.: 13/991,401

(22) PCT Filed: Nov. 28, 2011

(86) PCT No.: PCT/EP2011/071155
§ 371 (c)(1),
(2), (4) Date: Jun. 3, 2013

(87) PCT Pub. No.: WO2012/072571
PCT Pub. Date: Jun. 7, 2012

(65) Prior Publication Data
US 2013/0253692 A1    Sep. 26, 2013

(30) Foreign Application Priority Data

Dec. 1, 2010   (EP) .................................. 10193275

(51) Int. Cl.
*G01B 11/24* (2006.01)
*B21B 37/52* (2006.01)
(Continued)

(52) U.S. Cl.
CPC .............. *G01B 11/24* (2013.01); *B21B 37/52* (2013.01); *B21B 1/24* (2013.01); *B21B 1/28* (2013.01); *B21B 38/04* (2013.01)

(58) Field of Classification Search
CPC  G01B 11/24; B21B 37/52; B21B 1/24; B21B 1/28; B21B 38/04
(Continued)

(56) References Cited

U.S. PATENT DOCUMENTS 3,531,961 A * 10/1970 Dunn ...................... B21B 37/16
                                                       700/151
3,592,030 A *  7/1971 Smith, Jr. ............... B21B 37/60
                                                       700/155
(Continued)

FOREIGN PATENT DOCUMENTS

CN         1820863 A     8/2006    ............. B21B 37/16
CN         1883836 A    12/2006    ............. B21B 37/00
(Continued)

OTHER PUBLICATIONS

Parks, "Automatc Gauge Control—A primer", Aug. 2000, pp. 60-62.*

(Continued)

*Primary Examiner* — Kenneth M Lo
*Assistant Examiner* — Olvin Lopez Alvarez
(74) *Attorney, Agent, or Firm* — Slayden Grubert Beard PLLC

(57) ABSTRACT

A method is disclosed for actuating a tandem roll train, in particular a cold-strip tandem roll train, for producing a strip, e.g., a metal strip, wherein a plurality of drives are provided in a production direction of the strip, the speeds of which drives are adapted via cascade control by way of a master drive, wherein a property of the strip is determined and the direction of action of the cascade control is changed depending on said property, by a control factor (K) being provided, by way of which the direction of action of the cascade control is changed, wherein $0 \leq K \leq 1$, and wherein if (Continued)

$0<K<1$ the action direction is split proportionally between upstream cascading and downstream cascading.

15 Claims, 1 Drawing Sheet

(51) Int. Cl.
  *B21B 1/24* (2006.01)
  *B21B 1/28* (2006.01)
  *B21B 38/04* (2006.01)

(58) Field of Classification Search
  USPC .................................................. 700/148–156
  See application file for complete search history.

(56) References Cited

U.S. PATENT DOCUMENTS

| | | | | |
|---|---|---|---|---|
| 3,787,667 A | * | 1/1974 | King | B21B 37/16 700/152 |
| 3,808,858 A | * | 5/1974 | Connors | B21B 37/16 72/10.4 |
| 4,126,028 A | * | 11/1978 | Chapront | B21B 37/52 72/11.5 |
| 4,240,147 A | * | 12/1980 | Morooka | B21B 37/165 700/155 |
| 4,292,825 A | * | 10/1981 | Morooka | B21B 37/52 72/10.1 |
| 4,460,852 A | * | 7/1984 | Kondo | B21B 37/46 318/67 |
| 4,662,202 A | | 5/1987 | Lambert | 72/8.5 |
| 5,012,660 A | * | 5/1991 | Peterson | B21B 37/52 72/10.4 |
| 5,172,579 A | * | 12/1992 | Nojima | B21B 37/68 700/152 |
| 5,235,834 A | | 8/1993 | Bolkey et al. | 72/12.5 |
| 5,479,803 A | * | 1/1996 | Imanari | B21B 37/52 700/150 |
| 5,495,735 A | * | 3/1996 | Nishimura | B21B 37/16 72/11.8 |
| 5,619,880 A | * | 4/1997 | Polster | B21B 37/50 700/304 |
| 5,809,817 A | * | 9/1998 | Ginzburg | B21B 37/52 72/10.3 |
| 6,240,756 B1 | * | 6/2001 | Tsugeno | B21B 37/16 72/10.3 |
| 6,571,134 B1 | * | 5/2003 | Gramckow | B21B 37/28 700/128 |
| 6,619,092 B2 | * | 9/2003 | Nakayama | B21B 1/24 72/234 |
| 7,086,260 B2 | * | 8/2006 | Abi-Karam | B21B 37/20 700/155 |
| 8,186,195 B2 | | 5/2012 | Felkl | 72/10.3 |
| 8,302,445 B2 | | 11/2012 | Pawelski et al. | 72/241.8 |
| 2002/0112514 A1 | * | 8/2002 | Hartmann | B21B 37/16 72/7.6 |
| 2005/0125091 A1 | * | 6/2005 | Reinschke | B21B 37/28 700/148 |
| 2007/0068210 A1 | * | 3/2007 | Pittner | B21B 37/165 72/10.1 |
| 2009/0314873 A1 | * | 12/2009 | Schmid | B21C 47/003 242/534 |
| 2010/0050727 A1 | | 3/2010 | Botta | 72/205 |
| 2010/0193623 A1 | * | 8/2010 | Botta | B21B 37/48 242/418 |
| 2010/0326155 A1 | * | 12/2010 | Felkl | B21B 37/16 72/12.7 |
| 2013/0253692 A1 | | 9/2013 | Felkl | 700/148 |

FOREIGN PATENT DOCUMENTS

| | | | | |
|---|---|---|---|---|
| CN | 101448587 A | | 6/2009 | B21B 37/38 |
| JP | 02147114 | * | 6/1990 | B21B 39/08 |
| JP | 9-57317 | * | 4/2000 | B21B 37/18 |
| JP | 2003334603 A | | 11/2003 | B21B 37/00 |
| SU | 1445829 A1 | | 12/1988 | B21B 37/00 |
| WO | 2008/043605 A2 | | 4/2008 | B21B 37/48 |
| WO | 2009/106422 A1 | | 9/2009 | B21B 37/16 |
| WO | 2012/072571 A1 | | 6/2012 | B21B 37/52 |

OTHER PUBLICATIONS

Bilkhu et al, "Dynamic Control of Tension, Thickness and Flatness for a tandem COld Mill", Oct. 2001, pp. 49-54.*
International Search Report and Written Opinion, Application No. PCT/EP2011/071155, 14 pages.
Chinese Office Action, Application No. 2011800577403, 17 pages, Jun. 18, 2014.

* cited by examiner

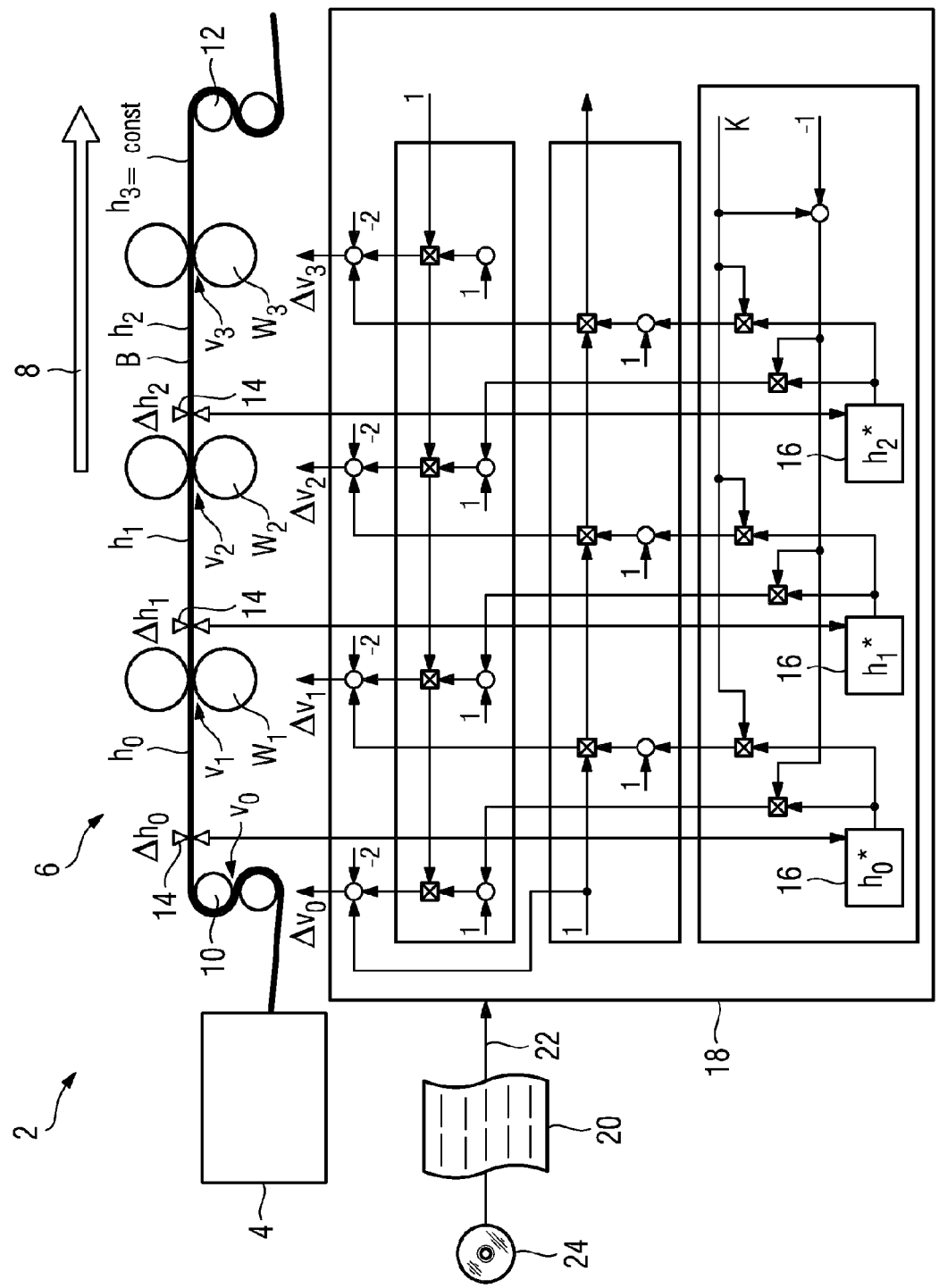

METHOD FOR ACTUATING A TANDEM ROLL TRAIN, CONTROL AND/OR REGULATING DEVICE FOR A TANDEM ROLL TRAIN, MACHINE-READABLE PROGRAM CODE, STORAGE MEDIUM AND TANDEM ROLL TRAIN

CROSS-REFERENCE TO RELATED APPLICATIONS

This application is a U.S. National Stage Application of International Application No. PCT/EP2011/071155 filed Nov. 28, 2011, which designates the United States of America, and claims priority to EP Patent Application No. 10193275.4 filed Dec. 1, 2010 The contents of which are hereby incorporated by reference in their entirety.

TECHNICAL FIELD

The application relates to a method for actuating a tandem roll train, in particular a cold-strip tandem roll train, for producing a strip, in particular a metal strip. The application further relates to a control and/or regulating device for a tandem roll train, a machine-readable program code for such a control and/or regulating device, a storage medium with machine-readable program code stored thereon as well as a tandem roll train comprising such a control and/or regulating device.

BACKGROUND

In systems where a number of drives are coupled to one another by way of a strip, in particular a metal strip, e.g. in the case of a rolling system, or by way of a web, e.g. a paper web, speed adjustments to one drive are frequently passed on to the adjacent drives to minimize interference with the tension in the strip or web. This process is referred to as cascading. "Drives" here refer in particular to parts of the system driven by an electric motor with the associated regulation. Drives in a rolling system are for example roll stands, S-rolls (so-called bridles), reels, deflection rolls, etc.

There are fixed action directions during cascading. For example during rolling cascading preferably takes place in the direction of slower roll stands. A master drive or speed master drive is defined within the part of the system where the drives are being cascaded. Drives upstream of the master drive are cascaded in the action direction of the inlet, in other words counter to the production direction of the strip (upstream), while drives downstream of the master drive are cascaded in the action direct of the outlet (downstream), i.e. in the production direction.

In a multipart system, e.g. in a rolling system with a continuous annealing line CAL and a tandem cold mill TCR or a double cold reduction mill DCR as system parts, cascading causes the strip speeds of the system parts to change in relation to one another. A tandem train here refers to a roll stand arrangement, which is made up of at least two roll stands connected one behind the other in a production direction of the metal strip. In order to counteract the change in strip speed, which also affects the further system parts, loop accumulators are provided between the system parts. In a technologically tension-sensitive system arrangement such as a rolling system with a continuous annealing line and a downstream inline rolling mill in the form of a tandem cold mill, system-based decoupling by means of a loop accumulator is however generally not sufficient to transport the strip without interference through the continuous annealing line.

A rolling system for producing a metal strip is known from WO 2008/043605 A2, wherein a first roll stand of a tandem train is deployed with the function of a driver to achieve a build-up of mechanical tension in the metal strip and thus to dispense with a unit with a function that increases strip tension, e.g. an S-roll. As the function of the first roll stand is changed, the second roll stand in the production direction now represents the first actively rolling stand within the tandem train.

SUMMARY

One embodiment provides a method for actuating a tandem roll train, in particular a tandem cold mill, for producing a strip, in particular a metal strip, wherein a number of drives are provided in a production direction, their speeds being adjusted by way of a cascade control using a master drive, wherein a property of the strip is determined and the action direction of the cascade control is changed between upstream and downstream as a function of said property, in that a regulating factor (K) is provided, which adjusts the action direction of the cascade control, where $0 \leq K \leq 1$, and where $0<K<1$ the action direction is split proportionally between upstream cascading and downstream cascading.

In a further embodiment, the action direction of the cascade control is changed in a settably split manner by way of an adjustment of the speed corrections of the drives.

In a further embodiment, the thickness of the strip is determined.

In a further embodiment, the tandem roll train comprises at least two roll stands connected one behind the other as drives and the property of the strip is measured at least upstream of the first roll stand.

In a further embodiment, the property of the strip is measured between the drives of the tandem roll train.

In a further embodiment, during cascading counter to the production direction the last roll stand in the production direction is actuated as the master drive.

In a further embodiment, the tandem roll train comprises at least one S-roll upstream of the roll stands in the production direction and the S-roll is actuated as the master drive during cascading in the production direction.

In a further embodiment, the rotation speed of the S-roll is stabilized by way of a prior torque control.

Another embodiment provides a control and/or regulating device for a tandem roll train, with a machine-readable program code, which features control commands, which when it is executed prompt the control and/or regulating device to perform any of the methods disclosed above.

Another embodiment provides a machine-readable program code for a control and/or regulating device for a tandem roll train, wherein the program code comprises control commands, which prompt the control and/or regulating device to perform any of the methods disclosed above.

Another embodiment provides a storage medium with such a machine-readable program code stored thereon.

Another embodiment provides a tandem roll train, such as a tandem cold mill for producing a strip, e.g., a metal strip, comprising a control and/or regulating device as disclosed above.

BRIEF DESCRIPTION OF THE DRAWINGS

An exemplary embodiment is discussed in more detail below based on FIG. 1, which shows a schematic and highly simplified diagram of two system parts of an overall system, specifically, a continuous annealing line and an inline rolling mill in the form of a tandem cold mill for producing a metal strip.

DETAILED DESCRIPTION

Embodiments of the present disclosure may provide for interference-free operation of a system, in particular a treatment line with a coupled tandem roll train, which is operated by way of regulation with cascaded positioning interventions (cascade control), as well as to provide a corresponding control and/or regulating device, a program code, a storage medium and a rolling system for this purpose.

For example, some embodiments provide a method for actuating a tandem roll train, in particular a tandem cold mill, for producing a strip, in particular a metal strip, wherein a number of drives are provided in a production direction of the strip, the speeds of which are adjusted by way of cascade control using a master drive, with a property of the strip being determined and an action direction of the cascade control being changed between upstream and downstream as a function of said property, in that a regulating factor K is provided, by means of which the action direction of the cascade regulation is adjusted, where $0 \leq K \leq 1$, and, where $0<K<1$, the action direction is split proportionally between upstream cascading and downstream cascading.

Some embodiments are based on the knowledge that interference-free operation of two coupled system parts is ensured, in that the speed of the strip between two system parts connected one behind the other in the production direction is kept essentially constant. The aim here is for the strip speed and therefore the tension in the inlet of the tandem roll train, which forms the second system part, to remain constant. To achieve this, the action direction of the cascade control is changed as required, to minimize interference with the strip in the inlet of the tandem roll train, as the most stationary inlet possible results in a regular profile of the strip through the upstream system part. The proposed regulation of the tandem roll train with the change of action direction of cascade regulation for example allows a tension-sensitive continuous annealing line (CAL) for thin material to be coupled without any problems to an inline rolling mill, as the strip tension in the continuous annealing line, which is upstream of the tandem roll train, is scarcely and in particular not affected.

For example at the start of operation of the rolling system with a continuous annealing line and a tandem roll train a last roll stand of the tandem roll train is selected as the speed master drive with a constant speed, so that upstream regulation of the drives takes place counter to the production direction. If during operation of the rolling system, due to fluctuations in the thickness of the metal strip upstream of the tandem train, an interference response occurs in an S-roll disposed between the continuous annealing line and the tandem train, such an interference response is counteracted in that the S-roll takes over the function of the speed master drive, with the result that the action direction of cascading changes to the downstream direction, i.e. the production direction. The master drive can thus be changed a number of times as required during operation of the rolling system, to stabilize the strip speed of the S-roll, with the metal strip also having a desired thickness that is as constant as possible at the end of the tandem roll train.

To allow interference-free coupling of the tandem roll train to the continuous annealing line, a regulating factor K is provided during speed regulation of the roll train, to allow the action direction of cascade control to be changed. The regulating factor K can be equal to 0 or equal to 1 or can have values between 0 and 1. Where K=0, the roll stand is the speed master drive in the system. Where K=1, the S-roll becomes the speed master drive. The value of the regulating factor K can however also be between 0 and 1, with the result that upstream cascading and downstream cascading take place at the same time in different proportions as defined by the regulating factor K. It can thus be set for example that 10% of the speed corrections act upstream on the inlet and 90% of the speed corrections act downstream on the outlet, so that both action directions of the cascade control are operated proportionally.

With regard to a dynamic regulation of the tandem roll train according to one advantageous embodiment the action direction of the cascade control is split in a settable manner by way of an adjustment of the speed corrections of the drives. Settable splitting of the speed corrections here means that the cascade control can adjust the speeds of all the drives, including the master drive, to a certain degree, said degree being a function of whether the speeds of the drives are to be regulated upstream or downstream. It is generally the case that the speed master drive, e.g. the last roll stand in the production direction of the strip, has a constant speed due to regulation. At the same time the speeds of the further drives vary so that a first drive, which is disposed furthest away from the speed master drive, can have relatively major speed fluctuations. These fluctuations are distributed by means of the settable adjustment of the speed corrections to all drives, in that the speed of the speed master drive is slightly changed by cascading, so that it is no longer constant but has minimal fluctuations. It is the case here that the greater the fluctuations in the speed of the speed master drive, the smaller those of the other drives are. A continuous increase in the irregularity of the speed of the original speed master drive with a simultaneous reduction in the speed corrections to the further drives therefore causes the speed master drive to "migrate" in the inlet direction, until ultimately the first drive in the production direction becomes the master drive.

According to a further embodiment the thickness of the strip is determined as the property of the strip. This has the important advantage that the thickness of the strip is directly related to the speed of the drives and thickness fluctuations are therefore the trigger for fluctuations of the drive speeds. Speed regulation based on strip thickness measurement has therefore proved to be particularly effective. If the strip in the inlet of the roll train is for example thicker in parts, the speed of the rolls is adjusted correspondingly, so that the strip has a constant thickness in the outlet of the roll train.

The tandem roll train preferably comprises drives in the form of at least two roll stands connected one behind the other and the property of the strip is measured at least upstream of the first roll stand. This allows fluctuations in the property of the strip, in particular strip thickness, to be detected in the inlet of the roll train and suitable regulation of the rotation speeds of the individual roll stands allows the strip to be rolled down to a desired, constant thickness in the outlet. To increase speed regulation accuracy, the property of the strip is expediently measured between the drives of the tandem train, in particular between the individual drives.

According to one embodiment during cascading counter to the production direction the last roll stand in the production direction is actuated as the master drive. This is particularly advantageous, to ensure the most constant strip speed possible at the end of the roll train. The last drive of a tandem roll train is generally selected as the speed master drive if the roll train is an offline rolling mill, in other words forms a decoupled unit, with no other system part upstream of it. Fluctuations in the rotation speed of the forward drives, which can cause fluctuations in the tension of the strip in the inlet of the roll train, are then not of great significance and the winding of the strip at constant strip tension is assisted.

However if a tension-sensitive system part, for example a CAL, is connected upstream of the tandem roll train, the tension fluctuations in the inlet of the roll train cannot simply be ignored. As the decoupling of the CAL from the tandem roll train by means of a loop accumulator or dancer roll is not reliable, the variable tension should be equalized in a different way, e.g. by appropriate actuation of an S-roll in the inlet of the roll train. In view of this, according to a further preferred variant the tandem roll train comprises at least one S-roll in the production direction and during cascading in the production direction the S-roll is actuated as the master drive, so that it is operated at a constant rotation speed. During operation of the system the master drive can be switched continuously or in steps as required as a function of the strip thickness and tension fluctuation states prevailing at the time in the inlet and in the outlet.

Provision is additionally preferably made for the speed of the S-roll to be stabilized by way of prior torque control. The S-roll here is then likewise the speed master drive and the prior torque control is preferably calculated in the thickness regulation. In one appropriate embodiment the speed correction of the first stand in the production direction is differentiated in a weighted manner. The differentiated speed correction describes the expected and undesirable acceleration of the S-roll, as would result from the tension fluctuation. If the S-roll is subjected in a timely manner to a drive torque, which is calculated from the expected acceleration and the inertia moment of the S-roll, the strip speed is stabilized on the inlet side of the S-roll even in relation to interfering tension fluctuations from the first stand of the tandem train.

The apparatus-related part of the object is achieved by a control and/or regulating device for a tandem roll train, with a machine-readable program code, which comprises control commands, which when it is executed prompt the control and/or regulating device to perform a method according to one of the preceding embodiments.

Other embodiments provide a machine-readable program code for a control and/or regulating device for a tandem roll train, the program code comprising control commands, which prompt the control and/or regulating device to perform the method according to one of the preceding embodiments.

Other embodiments provide a storage medium with such a machine-readable program code stored thereon.

Other embodiments provide a tandem roll train, in particular a tandem cold mill for producing a metal strip, comprising the control and/or regulating device described above.

An exemplary embodiment is described in more detail with reference to FIG. 1, which shows a schematic and highly simplified diagram of two system parts of an overall system 2: specifically a continuous annealing line (CAL), which is shown schematically by block 4, and an inline rolling mill in the form of a tandem cold mill 6 for producing a metal strip B.

In the illustrated exemplary embodiment the tandem roll train 6 comprises three actively rolling roll stands $W_1$, $W_2$ and $W_3$, which are connected one behind the other in a production direction 8. As the metal strip B is rolled, a not insignificant reduction occurs in the thickness of the metal strip B at all the roll stands $W_1$, $W_2$, $W_3$.

Disposed in the inlet of the tandem roll train 6 upstream of the first roll stand $W_1$ is a first S-roll 10 (also referred to as a bridle) and in the outlet of the tandem roll train 6 downstream of the last roll stand $W_1$ is a second S-roll 12 (bridle). The S-rolls 10, 12 guide the metal strip B and maintain its internal tensile stresses.

The first S-roll 10 and the roll stands $W_1$, $W_2$, $W_3$ are the essential drives of the tandem roll train 6, their speeds $v_0$, $v_1$, $v_2$, $v_3$ being adjusted by way of a cascade control during operation. Further drives can be for example the second S-roll 12 as well as reels or deflection rolls (not shown in the FIGURE), which are also included in the cascade.

Apparatuses 14 for measuring strip thickness are provided upstream of the individual roll stands $W_1$, $W_2$, $W_3$. Each of the apparatuses 14 supplies an actual value $h_0$, $h_1$, $h_2$ for strip thickness, which is compared in corresponding thickness regulators 16 to a setpoint value $h_0^*$, $h_1^*$ and $h_2^*$. A cascade control of the speeds $v_0$, $v_1$, $v_2$, $v_3$ of the first S-roll and the roll stands $W_1$, $W_2$, $W_3$ takes place based on the comparison of the actual values $h_0$, $h_1$, $h_2$ to the setpoint values $h_0^*$, $h_1^*$ and $h_2^*$. Such speed cascading is performed by a control and/or regulating device 18, which is assigned a machine-readable program code 20 with control commands 22 stored on a storage medium 24, e.g. a hard disk or CD. The primary aim of thickness regulation including such cascade control is for the strip thickness $h_3$ to be constant in the outlet of the tandem roll train 6, i.e. downstream of the last roll stand $W_3$. If a thickness fluctuation is detected in the strip B, i.e. $\Delta h_0 \neq 0$, $\Delta h_1 \neq 0$ and $\Delta h_2 \neq 0$, a speed correction $\Delta v_0$, $\Delta v_1$, $\Delta v_2$ and $\Delta v_3$ is therefore applied to the speeds $v_0$, $v_1$, $v_2$, $v_3$ of the drives 10, $W_1$, $W_2$ and $W_3$.

The cascade control is characterized by an action direction. With an arrangement according to the FIGURE the cascade control usually acts upstream in the direction of the inlet, i.e. counter to the production direction 8. With such regulation the speed correction $\Delta v_3$ of the last roll stand $W_3$ is equal to 0. The roll stand $W_3$ here is a master drive or speed master drive. The speed corrections $\Delta v_0$, $\Delta v_1$, $\Delta v_2$ for achieving a constant thickness $h_3$ are therefore split between the other drives 10, $W_1$, $W_2$.

This type of regulation can however cause relatively significant speed fluctuations to occur in the inlet of the roll train 6, producing tension fluctuations in the strip B in this region. Such tension fluctuations cannot be eliminated totally by loop accumulators between the continuous annealing line 4 and the roll train 6 and therefore interfere with the operation of the tension-sensitive continuous annealing line 4.

In order to counteract the tension fluctuations and therefore allow interference-free coupling of both system parts 4, 6, a regulating factor K ($0 \leq K \leq 1$) is provided during speed regulation of the roll train 6, which can change the action direction of the cascade control. In the illustrated exemplary embodiment K can have values between 0 and 1. At the start K=0, so that, as described above, the speed correction $\Delta v_3$ of the last roll stand $W_3$ is equal to 0, i.e. the roll stand $W_3$ is the speed master drive in the system. To stabilize the strip speed of the first S-roll 10, the action direction of the cascade control is rotated, in that for K=1 the speed correction $\Delta v_0$ of the first S-roll 10 becomes equal to 0 and the S-roll 10 becomes the speed master drive. By changing the value of the regulating factor K from 0 to 1 or vice versa it is therefore possible to switch the speed master drive continuously or erratically (in a binary manner) and change the action direction of the cascade control.

However the regulating factor K can also have values between 0 and 1, with the result that the action direction is set proportionally between upstream and downstream. A regulating factor 0<K<1 means that the interference response of the speed of the first S-roll 10 is improved by a counter speed correction application. A positive thickness error $\Delta h_0 > 0$ with a regulating factor K=0.95 therefore means that mainly the roll speeds $v_1$, $v_2$, $v_3$ of the roll stands $W_1$, $W_2$ and $W_3$ are increased. As the speed $v_1$ of the first roll stand $W_1$ is increased, the strip tension increases between the first S-roll 10 and the roll stand $W_1$, so the S-roll 10 is also accelerated by the increased strip tension. However the factor K=0.95 gives the S-roll 10 a low speed correction value $v_0$ of 5% in the "delay" direction, so the actual speed of the S-roll 10 is stabilized dynamically by the overlaying of the speed correction $\Delta v_0$ with the tensile response.

The change of action direction during cascade control of the roll train 6 allows tension-sensitive system parts 4, 6 to be coupled together. In particular a DCR rolling mill can be configured with the same regulation software, functioning as an offline and inline rolling mill. The technologically different requirements in respect of the action direction of the speed cascade with the two instances of use of the DCR rolling mill are easily satisfied by the parameterization of the regulating factor K.

What is claimed is:

1. A method for actuating a tandem cold mill for producing a metal strip, wherein a plurality of drives are provided in a production direction, the method comprising:
   determining a property of the strip at multiple locations, each location associated with one of the plurality of drives,
   calculating a difference between the property of the strip determined for each of the multiple locations and a setpoint for each of the multiple locations, and
   adjusting the speed of each of the plurality of drives as a function of each of said associated differences and a variable regulating factor, K, with a value between 0 and 1, inclusive, and
   setting 0<K<1 to cause an action direction to split based on the value of K as set with a result that upstream cascading and downstream cascading control take place at the same time in different proportions as defined by the regulating factor K and an adjustment to the value of K results in a speed correction cascading along the plurality of drives based on the value of K and each of said associated differences.

2. The method of claim 1, wherein the property of the strip comprises a thickness of the strip.

3. The method of claim 1, wherein the tandem cold mill comprises at least two roll stands connected one behind the other as drives, and wherein the property of the strip is measured at least upstream of a first roll stand.

4. The method of claim 3, wherein the property of the strip is measured between the drives of the tandem cold mill.

5. The method of claim 1, wherein during cascading counter to the production direction a last roll stand in the production direction is actuated as a master drive.

6. The method of claim 1, wherein the tandem cold mill comprises at least one S-roll upstream of the roll stands in the production direction, and wherein the S-roll is actuated as a master drive during cascading in the production direction.

7. The method of claim 6, wherein a rotation speed of the S-roll is stabilized by way of a prior torque control.

8. A control device for a tandem roll train, comprising a machine-readable program code stored in non-transitory computer-readable media and executable by a processor to:
   determine a property of a strip at multiple locations, each location associated with one of a plurality of drives,
   calculate a difference between the property of the strip determined at each of the multiple locations and a setpoint for each of the multiple locations, and
   adjust a speed of each of the plurality of drives as a function of said associated difference and a variable regulating factor, K, with a value of K between 0 and 1, inclusive, and
   setting 0<K<1 to cause an action direction to split based on the value of K as set with a result upstream cascading and downstream cascading control take place at the same time in different proportions as defined by the regulating factor K and an adjustment to the value of K results in a speed correction cascading along the plurality of drives based on the value of K and each of said associated differences.

9. The control device of claim 8, wherein the property of the strip comprises a thickness of the strip.

10. The control device of claim 8, wherein the tandem roll train comprises at least two roll stands connected one behind the other as drives, and wherein the property of the strip is measured at least upstream of a first roll stand.

11. The control device of claim 10, wherein the property of the strip is measured between the drives of the tandem roll train.

12. The control device of claim 8, wherein during cascading counter to the production direction a last roll stand in the production direction is actuated as a master drive.

13. The control device of claim 8, wherein the tandem roll train comprises at least one S-roll upstream of the roll stands in the production direction, and wherein the S-roll is actuated as a master drive during cascading in the production direction.

14. The control device of claim 13, wherein a rotation speed of the S-roll is stabilized by way of a prior torque control.

15. A tandem cold mill for producing a metal strip, comprising:
   a plurality of drives provided in a production direction, and an automated control device programmed to:
      determine a property of the strip at multiple locations, each location associated with one of the plurality of drives,
      calculate a difference between the property of the strip determined at each of the multiple locations and a setpoint for each of the multiple locations, and
      adjust a speed of each of the plurality of drives as a function of each of said associated differences and a variable regulating factor, K, with a value of K between 0 and 1, inclusive, and
      set 0<K<1 to cause an action direction to split based on the value of K as set with a result that upstream cascading and downstream cascading take place at the same time in different proportions as defined by the regulating factor K and an adjustment to the value of K results in a speed correction cascading along the plurality of drives based on the proportion K and each of said associated differences.

* * * * *